April 13, 1937. K. H. HUBBARD ET AL 2,076,642

OSCILLOMETER

Filed Nov. 7, 1935

INVENTOR
KARL H. HUBBARD
HENRY L. MASON
BY
D. Clyde Jones
ATTORNEY

Patented Apr. 13, 1937

2,076,642

UNITED STATES PATENT OFFICE 2,076,642

OSCILLOMETER

Karl H. Hubbard and Henry L. Mason, Rochester, N. Y., assignors to Taylor Instrument Companies, Rochester, N. Y., a corporation of New York Application November 7, 1935, Serial No. 48,700

5 Claims. (Cl. 73—44)

This invention relates to oscillometers.

In oscillometers for measuring the intensity of the pulse, such as are used in the determination of the quality of the circulation in human limbs, it has been customary to encircle the limb with a cuff inflated with air which inflated cuff communicates with a sensitive indicating device, such as a graduated glass tube containing a drop of colored liquid, so that at each beat of the pulse the liquid drop rises and falls to give a measure of the pulse intensity. Since the air in the cuff is elastic and since its volume is different for each application of the cuff, it absorbs some of the pulse energy so that an error is thereby introduced into the oscillometer reading.

In accordance with the main feature of the present invention, the cuff and the indicating portion of the oscillometer are filled with an inelastic fluid, such as water, whereby a negligible amount of pulse energy is absorbed and consequently the instrument is rendered more accurate.

A further feature of the present invention relates to the novel arrangement of parts of an oscillometer whereby readings are made conveniently and accurately.

Figure 1:
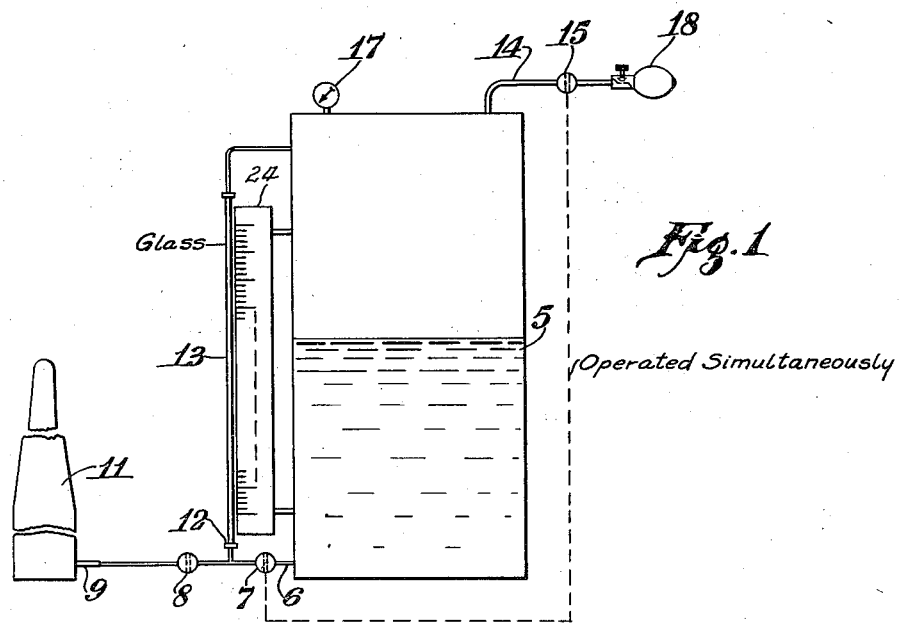
Figure 2:
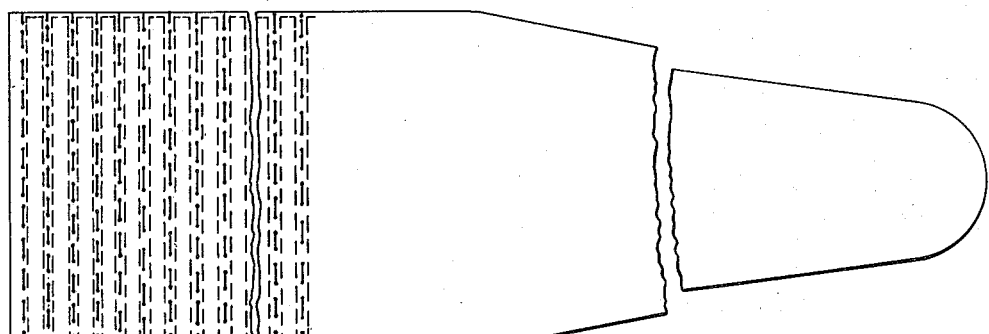
Figure 3:
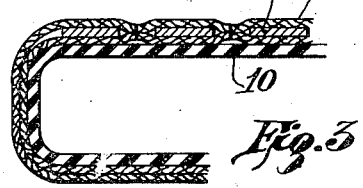

Other features and advantages of the invention will appear from the detailed description and claims when taken with the drawing in which Fig. 1 is a diagrammatic showing of the oscillometer of the present invention; Fig. 2 is a plan view with a part thereof broken away, illustrating one type of cuff suitable for use with the present invention; and Fig. 3 is a fragmentary longitudinal section illustrating the construction of the outer covering of the cuff and its relation to the rubber bag therein whereby only that portion of the cuff in contact with the flesh of the limb is capable of expansion and contraction.

In Fig. 1, 5 designates a closed receptacle containing a colored liquid such as water. A conduit 6, having valves or ordinary stop cocks 7 and 8 therein, communicates with the lower portion of the receptacle and is connectible to the rubber tube 9 of a rubber bag 10 within the applicator or cuff 11. A branch conduit 12 which includes a glass section or tube 13 communicates with the interior of the upper part of the receptacle and also communicates with the conduit 6 at a point thereon between the stop cocks 7 and 8. A suitably graduated scale 24 is mounted on the side of the receptacle to extend adjacent the tube 13, or may be engraved upon the tube itself.

The upper part of the receptacle communicates with the conduit 14 having a valve or stop cock 15 therein, which conduit is connected to a hand bulb air pump 18 of well-known construction, such as is disclosed in the patent to Bandoly No. 2,006,878, granted July 2, 1935. A suitable gauge or manometer 17 is mounted on the top of the receptacle with its pressure-sensitive element exposed to the air within the interior of the upper part of the receptacle so that the air pressure therein is known at all times. In practice the stop cocks 7 and 15 are interconnected so that they can be opened and closed simultaneously by a common handle (not shown).

The cuff may be similar in construction to that disclosed in the patent to D. R. Barr No. 1,667,409 granted April 24, 1928 but differs from the cuff of that patent, however, in that there is but a single tube or outlet therefrom. In order to render the reading of the oscillometer more accurate, it is essential that all portions of the cuff shall be inextensible, except the part thereof in contact with the flesh of the limb wherein the pulse is being tested. In order to effect this result, the rubber bag 10 is covered with the cloth cuff 11, the outer surface of which is reenforced by relatively stiff, parallel strips 16 of metal or the like.

In using the oscillometer, the cuff 11 is wrapped around the arm or leg in the same manner as in the taking of sphygmomanometer readings at a position on the arm or leg where it is desired to test the quality of the circulation. When the cuff has thus been applied, the valves 7, 8 and 15 are opened and the hand pump 18 operated until the desired air pressure is established within the receptacle, as indicated by the manometer 17. The valve 8 is then closed until the liquids in the receptacle and in the column in the glass tube 13 are at the same height. Thereafter the valve 8 is opened and the valves 7 and 15 are closed. At each beat of the pulse, the cuff is slightly compressed by the limb with the result that some of the liquid therein will be forced out of the rubber bag 10 and caused to rise in the glass tube 8, the height of the excursion of the liquid being a measure of the intensity of the impulse.

It will be understood that the invention is not limited to the use of a cuff but instead, any type of liquid-filled applicator may be employed which permits the pulse beats to be communicated to the liquid in the glass tube 13.

We claim:

1. In a device of the class described, a closed receptacle, an applicator having a flexible portion, a conduit connecting the interior of said applicator with the interior of said receptacle, a transparent vertically extending tube communicating at its lower end with said conduit and communicating at its upper end with the upper portion of the interior of said receptacle, a liquid filling said applicator, said conduit, as well as the lower portions of said tube and said receptacle, means for supplying air under pressure to the upper portions of said receptacle and said tube, and a stop-cock in the portion of the conduit extending between said receptacle and the lower end of said tube to prevent flow in both directions through said conduit at will.

2. In a device of the class described, a closed receptacle, an applicator having a flexible portion, a conduit connecting the interior of said applicator with the interior of said receptacle, a transparent vertically extending tube communicating at its lower end with said conduit and communicating at its upper end with the upper portion of the interior of said receptacle, a liquid filling said applicator, said conduit, as well as the lower portions of said tube and said receptacle, means for supplying air under pressure to the upper portions of said receptacle and said tube, and a stop-cock in said conduit at each side of its connection with said tube to prevent flow in both directions through said conduit at will.

3. In a device of the class described, a closed receptacle, an applicator having a flexible portion, a conduit connecting the interior of said applicator with the interior of said receptacle, a transparent vertically extending tube communicating at its lower end with said conduit and communicating at its upper end with the upper portion of the interior of said receptacle, a stop cock in said conduit at each side of its connection with said tube to prevent flow in both directions through said conduit at will, a liquid filling said applicator, said conduit, as well as the lower portions of said tube and said receptacle, a pipe through which air under pressure is supplied to the upper portion of said receptacle and the upper portion of said tube, and a stop cock in said pipe.

4. In a device of the class described, a closed receptacle, an applicator having a flexible portion, a conduit connecting the interior of said applicator with the interior of said receptacle, a transparent vertically extending tube communicating at its lower end with said conduit and communicating at its upper end with the upper portion of the interior of said receptacle, a stop cock in said conduit at each side of its connection with said tube to prevent flow in both directions through said conduit at will, a liquid filling said applicator, said conduit as well as the lower portions of said tube and said receptacle, a pipe through which air under pressure is supplied to the upper portion of said receptacle and to the upper portion of said tube, a stop cock in said pipe, and means for simultaneously operating said last-mentioned stop cock and the stop cock in that portion of the conduit between said receptacle and said tube.

5. In a device of the class described, a closed receptacle, an applicator having a flexible portion, a conduit connecting the interior of said applicator with the interior of said receptacle, a transparent vertically extending tube communicating at its lower end with said conduit and communicating at its upper end with the upper portion of the interior of said receptacle, a liquid filling said applicator, said conduit, as well as the lower portions of said tube and said receptacle, means for supplying air under pressure to the upper portions of said receptacle and said tube, a stop cock in the portion of the conduit extending between said receptacle and the lower end of said tube to prevent flow in both directions through said conduit at will, and a manometer communicating with the upper portion of the interior of said receptacle.

KARL H. HUBBARD.
HENRY L. MASON.